United States Patent
Abdelnur (12)

(10) Patent No.: US 6,208,994 B1
(45) Date of Patent: Mar. 27, 2001

(54) SUPPORTERS PROVIDING EXTENSIBLE CLASSES WITHOUT RECODING FOR OBJECT-ORIENTED APPLICATIONS

(75) Inventor: Alejandro H. Abdelnur, Sunnyvale, CA (US)

(73) Assignee: Sun MIcrosystems, Inc., Palo Alto, CA (US)

( * ) Notice: Subject to any disclaimer, the term of this patent is extended or adjusted under 35 U.S.C. 154(b) by 0 days.

(21) Appl. No.: 09/096,852

(22) Filed: Jun. 11, 1998

(51) Int. Cl.[7] ..................................................... G06F 17/30
(52) U.S. Cl. .................... 707/103; 104/4; 395/500.12; 345/335; 345/339; 709/305
(58) Field of Search ..................... 707/103, 104, 707/4; 395/500.12; 345/335, 339; 709/305

(56) References Cited

U.S. PATENT DOCUMENTS 5,761,656 * 6/1998 Ben-Shachar ............... 345/335
5,872,973 * 2/1999 Mitchell et al. .............. 709/305
6,023,271 * 2/2000 Quaeler-Block et al. ........... 345/335

* cited by examiner

Primary Examiner—Thomas G. Black
Assistant Examiner—Diane D. Mizrahi
(74) Attorney, Agent, or Firm—Pennie & Edmonds LLP

(57) ABSTRACT

A system and method for adding support for new contained classes to a container class that does not require the container class to be recompiled. Also disclosed is a system and method for building container classes that does not require a programmer to explicitly code methods related to the contained classes. A set of classes, called Supporters, provides support for contained classes. Related Supporters can be packaged as a library that can be shipped with programming environments, updated APIs or device drivers. A SupporterAffinity manages Supporters for use by a particular contained class. A SupporterAffinity method ("getSupporter") can be invoked to add a Supporter for a new contained class to the SupporterAffinity, allowing an instance of the container class to use that Supporter's methods on instances of the new contained class. Because support for the new container class is provided via the SupporterAffinity and the new Supporter, there is no need to recode the container class.

32 Claims, 6 Drawing Sheets

Container Class 156-I

| | |
|---|---|
| Initialization Statements | 164 |
|    SupporterAffinity Declaration | 180 |
| Container Methods | 162 |
|    Constructor | 182 |
|    Miscellaneous Methods | 184 |
|       include() | 184.1 |
|       remove() | 184.2 |
| Data Structures | 160 |

Container Class
156-I

| | |
|---|---|
| Initialization Statements | 164 |
|    SupporterAffinity Declaration | 180 |
| | |
| Container Methods | 162 |
|    Constructor | 182 |
|    Miscellaneous Methods | 184 |
|       include() | 184.1 |
|       remove() | 184.2 |
| | |
| Data Structures | 160 |

```
public class DoSomething() {
    static private SupporterAffinity affinity          — 202
        = new SupporterAffinity
    static public addSupporter (Supporter s) {         — 204
        affinity.addSupporter (s);                     — 206
    }
    public DoSomething() {
        // constructor                                 — 208
    }
    public void include (Object ob) {                  — 210
        Supporter s = affinity.getSupporter(ob)        — 212
        ((DoSomethingSupporter) s).include(ob)         — 214
    }
    public void remove (Object ob) {                   — 216
        Supporter s = affinity.getSupporter(ob)        — 218
        ((DoSomethingSupporter) s).remove(ob)          — 220
    }
    public void doThis (Object ob) {                   — 222
        Supporter s = affinity.getSupporter(ob)        — 224
        ((DoSomethingSupporter) s).doThis(ob)          — 226
    }
    public void doThat (Object ob) {                   — 228
        Supporter s = affinity.getSupporter(ob)        — 230
        ((DoSomethingSupporter) s).doThat(ob)          — 232
    }
}
```

162-N

```
public interface DoSomethingSupporter extend Supporter {   — 240
    public include (Object o);                             — 242
    public remove (Object o);                              — 244
    public doThis (Object o);                              — 246
    public doThat (Object o);                              — 248
}
```

150-N

```
DoSomething.addSupporter (new TextFieldDoSomethingSupporter());   — 250
DoSomething.addSupporter (new ListDoSomethingSupporter());        — 252
DoSomething.addSupporter (new VectorDoSomethingSupporter());      — 254
```

FIG. 2

SUPPORTERS PROVIDING EXTENSIBLE CLASSES WITHOUT RECODING FOR OBJECT-ORIENTED APPLICATIONS

The present invention relates generally to managing collections of objects, and particularly to extending the object classes supported by a class that works with a collection of objects.

A portion of the disclosure of this patent document contains materials to which a claim of copyright protection is made. The copyright owner has no objection to the facsimile reproduction by anyone of the patent document or the patent disclosure, but reserves all other rights whatsoever.

BACKGROUND OF THE INVENTION

In the object-oriented paradigm, all tasks are performed by objects, which include attributes that hold information and methods that accomplish tasks and interact with other objects. Each object is an instance of a class that defines the object's attributes and methods. Some classes (hereinafter, "containers"), need to interact with many different types of classes (hereinafter, "contained"). For example, in an application that has a graphical user interface, a object that is an instance of a particular container class (e.g., a "DoSomething" class) might need to interact with the individual objects that correspond to the GUI components, each of which could be an instance of a different GUI component class. Conventionally, there are three ways a container class can refer to the contained classes.

In a first way, the container class includes specialized methods that perform specific operations on specific classes. Each of these methods has a unique name. For example, assuming that the DoSomething class can be used to add text field, list and vector GUI components to a GUI, the DoSomething class, written in the Java™ programming language (Java and all Java-based trademarks and logos are trademarks or registered trademarks of Sun Microsystems, Inc. in the United States and other countries), might look as shown in Table 1:

TABLE 1

```
public class DoSomething {
    public DoSomething (){
        // constructor code for the DoSomething class
    }
    public void includeTextField (TextField tf) {
        // code that adds a text field component
    }
    public void includeList (List l) {
        // code that adds a list component
    }
    public void includeVector (Vector v) {
        // code that adds a vector component
    }
}
```

Syntax of the Java™ programming language is well-known; however, because examples in the Java™ programming language are used throughout this document, a few of the statements above are now described. The first statement, "public DoSomething( )" declares a constructor method that is invoked by a programmer whenever they wish to create another object instance of the DoSomething object class. All Java™ programming language classes have constructors, whose name is the same as the associated class. The actual constructor method code is not shown, but is referred to in the comment, "// constructor code for the DoSomething class". The second statement, "include TextField(TextField tf)" declares a specialized method that is invoked whenever a programmer wishes to add a TextField GUI component to an application GUI. Subsequent statements are declarations for similar methods for adding the other types of GUI components. This form of container is not commonly used as it results in a very large API (Application Programming Interface) due to the proliferation of public methods for manipulating different types of GUI components. For more information on the Java™ programming language syntax, refer to Patrick Niemeyer & Joshua Peck, "Exploring Java, "(2nd ed. 1997), which is entirely incorporated herein by reference.

In a second way, referred to as overloading, the container class provides unique methods to handle the contained classes, but assigns the same name to methods that accomplish the same goal. For example, using overloading, the DoSomething class, written in the Java™ programming language, might look as shown in Table 2:

TABLE 2

```
public class DoSomething {
    public DoSomething (){
        // constructor code for the DoSomething class
    }
    public void include (TextField tf) {
        // code that adds a text field component
    }
    public void include (List l) {
        // code that adds a list component
    }
    public void include (Vector v) {
        // code that adds a vector component
    }
}
```

Given such a container class a programmer can add any type of supported GUI component by simply issuing a call to DoSomething.include (ob), where ob is an object of a supported class. The Java™ programming language compiler then automatically uses whichever include method corresponds to the class of ob. Overloading is the most commonly used technique for handling contained classes because it reduces the size of the API without needing the if-then-else clauses employed by the third way, which is now described.

In the third way, the container class provides a general method that can handle objects of any of the supported contained classes. Such general methods employ if-then-else clauses to determine which code to apply, based on the class of the object passed to the method. For example, using general methods, the DoSomething class, written in the Java™ programming language, might look as shown in Table 3:

TABLE 3

```
public class DoSomething {
    public DoSomething (){
        // constructor code for the DoSomething class
    }
    public void include (Object ob) {
        if (ob instanceof TextField) {
            // code that adds a text field component
        } else if (ob instanceof List) {
            // code that adds a list component
        } else if (ob instanceof Vector) {
            // code that adds a vector component
        }
    }
}
```

With a container class implemented in this way a programmer can add any type of supported GUI component by simply issuing a call to DoSomething.include (arg), where arg is an object instance of a supported class. In contrast to the second way, the if-then-else clause selects the correct code based on the class of the object arg. Using an if-then-else clause allows the API to be simplified but, due to the additional statements, adds to the size of the container class and instances thereof. For this reason, this technique is not as widely used as the overloading method.

Problems with each of these methods arise when the container class needs to support another type of contained object (e.g., a RadioButton component). When this need arises, the container object needs to be completely recoded to include the new class. This is because each container includes all of the code it needs to handle the contained classes. For example, in the first case, a new includeRadioButton (RadioButton rb) method would need to be added to the container class, in the second case a new include (RadioButton rb) method would need to be added, and in the third case a new else if (ob instanceof RadioButton) statement and associated code would need to be added.

The requirement of adding new code to existing classes results in extended product release dates and testing to ensure that the new classes are operable (even if support for only one new class is added to an existing container). Therefore, there is a need for technology that enables support for new classes to be added to a container class that does not require modification or recoding of the container class.

SUMMARY OF THE INVENTION

In summary, a system and method for adding support for new classes to a container class implemented in accordance with the present invention does not require the container class to be recoded. Additionally, a system and method for building container classes implemented in accordance with the present invention does not require a programmer to explicitly code methods related to the contained classes.

In particular, an embodiment of the present invention includes a set of classes, called Supporters, that provide support for contained classes. Related Supporters can be packaged as a library that can be shipped with programming environments, updated APIs or device drivers. For example, a Java™ programming environment might include a library of GUI Supporters, each of which includes methods that support a respective type of Java™ GUI component (e.g., each GUI Supporter could have methods for including, removing and otherwise manipulating a respective type of GUI component).

Another embodiment includes a SupporterAffinity class that includes methods for managing a set of Supporters. In this embodiment each instance of the SupporterAffinity class manages the set of Supporters associated with a particular container class. The getSupporter method, when invoked on an object ob with an unspecified type, returns a Supporter from the set of Supporters managed by the corresponding SupporterAffinity that is compatible with the object ob. This structure frees the programmer from including in the container class any code that is related to the type of the contained objects to be manipulated.

In yet another embodiment a container class includes contained methods, possibly overloaded, for manipulating different types of contained objects. Each of the contained methods is invoked with an object ob and needs no more than two statements. The first statement invokes the getSupporter method on the object ob; this method attempts to obtain from the SupporterAffinity class a Supporter s associated with the class of the object ob. If the getSupporter method is successful (i.e., does not return an exception due to lack of support in the SupporterAffinity for the object ob), the second statement invokes the contained method of the Supporter s on the object ob. For example, the object ob might by a TextField object, the contained method an include method and the Supporter s a Supporter for TextField GUI components. Because the getSupporter method adds to the container class support for objects as needed, there is no need to include in the container class additional code directed to specific contained object classes. This is why the present invention does not require recoding in such situations.

In the event that the SupporterAffinity class does not support a particular object class, the present invention also includes an addSupporter method that can be used to add a Supporter s to the SupporterAffinity class. Once the Supporter s is part of the SupporterAffinity class it can be added to a container class in the same manner as other types of Supporters. This feature enables new classes to be added to an application simply by loading supporters for the new classes into an existing SupporterAffinity. This is especially useful in situations where support is being added to an application for a new set of drivers or an extended API.

Another embodiment also includes a Supporter class with two methods, a getSupportedClass method and a getInstance method. The getSupportedClass method receives a Supporter s and returns the class the Supporter s claims to support. The getInstance method returns a fresh clone of a Supporter class passed to it. These methods are employed by the addSupporter and getSupporter methods of the SupporterAffinity class.

BRIEF DESCRIPTION OF THE DRAWINGS

Additional objects and features of the invention will be more readily apparent from the following detailed description and appended claims when taken in conjunction with the drawings, in which:

FIG. 1B is a block diagram of a generic Container class 156-I in accordance with the present invention;

FIG. 2 is a block diagram of examples of a Container class 156-N, an interface declaration for the Container class 156-N and program statements adding support for new Contained classes to the Container class 156-N constructed in accordance with the present invention;

DESCRIPTION OF EMBODIMENTS

Figure 1A:
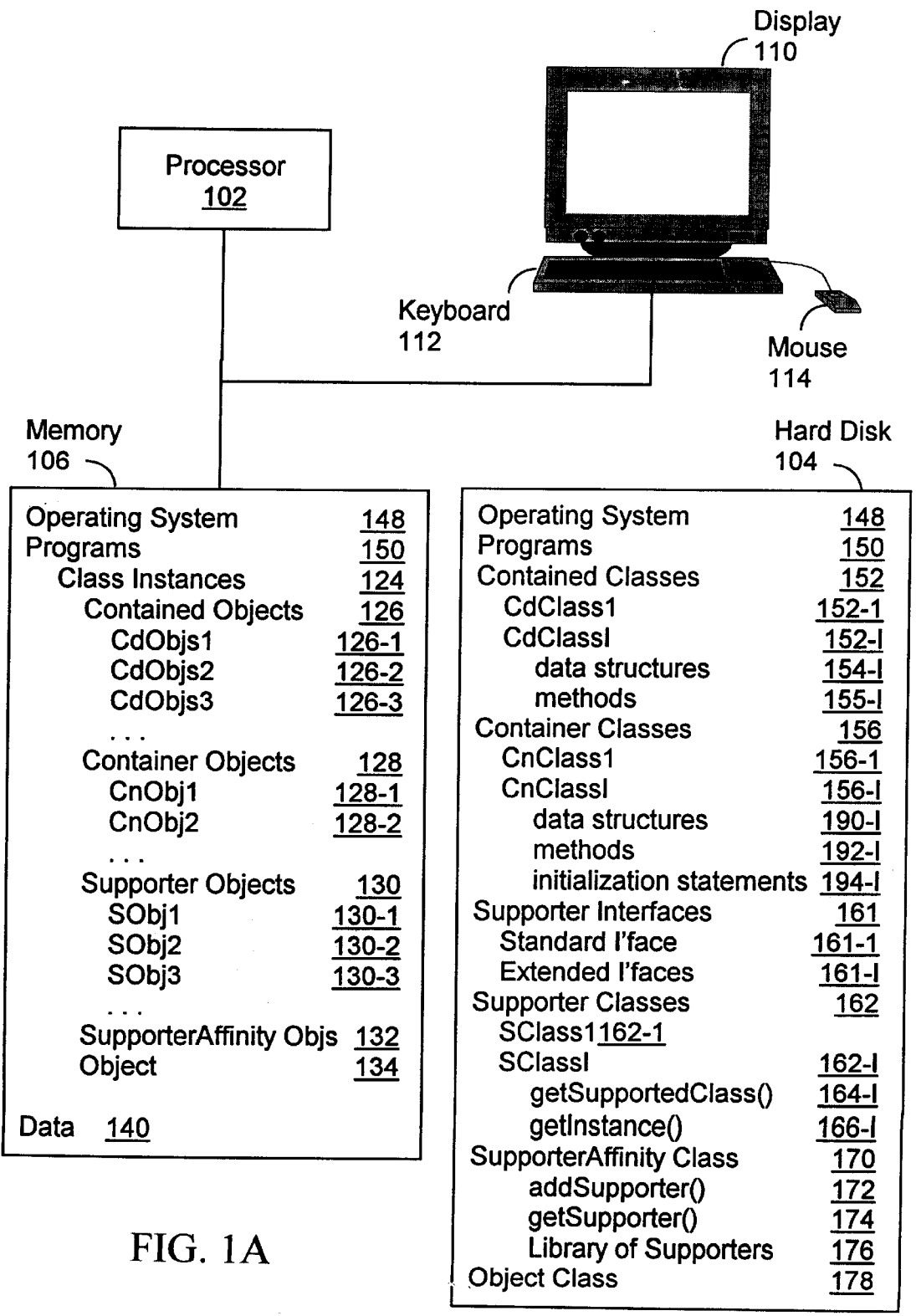
FIG. 1A is a block diagram of a computer system in which the present invention can be implemented.

Referring to FIG. 1A, there is shown a diagram of a computer system 100 in which the present invention can be implemented. The computer system 100 includes a processor 102; a slow, secondary memory, such as a hard disk 104; a fast, primary memory, such as a semiconductor random access memory (RAM) 106; a display 110; and user input devices, such as a keyboard 112 and mouse 114.

The computer system 100 operates according to well-known principles. The hard disk 104 permanently stores an operating system 148 and programs 150. The programs employ Contained classes 152, Container classes 156, Supporter interfaces 161, Supporter classes 162, a SupporterAffinity class 170 and an Object class 178, which are also stored on the hard disk 104. The programs 150 and classes 152, 156, 162, 170, 178 can be stored as source code and/or executables. The operating system 148, programs 150 and class instances 124 (sometimes referred to herein as "objects") are loaded into the primary memory 106 for use by the processor 102. The instances 124 include Contained objects 126, Container objects 128, Supporter objects 130, SupporterAffinity objects 132 and Object objects 134, which are instances of the classes 152, 156, 162, 170, 178, respectively. Additional details of the classes are provided below. The memory 106 can also include data used by the programs 150.

The processor 102 executes the programs 150 under control of the operating system 148, which also provides the programs 150 with access to system resources, such as the hard disk 104, the display 110 and the user input devices 112, 114. The Contained objects 126, Container objects 128, Supporter objects 130, SupporterAffinity objects 132 and Object objects 134 are allocated at program load time or at runtime by the programs 150 using constructor methods defined by each object's corresponding class.

The Contained classes 152 and Container classes 156 correspond to the contained classes and container classes described in the background. As shown in FIG. 1, each Contained class I (CdClassI) 152-I includes associated data structures 154 and methods 155. For example, the class CdClassI 152 - 1 might include methods and data structures related to defining the position and content of TextField GUI components. A Container class I (CnClassI) 158-I includes associated data structures 190, methods 192 and initialization statements 194 that are executed each time the class is instantiated. Additional details of the Container objects are described below in reference to FIG. 1B.

Referring to FIG. 1B, there is shown a block diagram of a generic Container class 156-I. In this embodiment the Container class's initialization statements 194 include a SupporterAffinity declaration 180 that creates an instance 132 of the SupporterAffinity class 170 that is private to the Container class instance 128 being initialized. The Container class methods 192 include a constructor method 182 and miscellaneous methods 184 for managing instances of its associated Contained classes 156. The miscellaneous methods 184 typically apply to all or many of the Container's Contained classes. For example, if the Contained classes were associated with respective GUI component types, the miscellaneous methods 184 could be include( ) and remove( ) methods 184.1, 184.2 applicable to all of those component types.

Referring again to FIG. 1, each Supporter class (SClass) 162 includes data structures and methods for providing Container classes 152 with support in dealing with a particular Contained class. In the illustrated embodiment each Supporter Class 162 includes standard methods that conform to a template set out in a standard Supporter interface 161-1. An interface is a Java™ programming language construct that defines a list of methods. Any class that implements all of the interface's methods is said to be an implementation of that interface. A class can implement more than one interface. The present invention employs interfaces in this matter to provide flexibility; however, similar functionality can be provided with classes. For more background information on interfaces, refer to Patrick Niemeyer & Joshua Peck, "Exploring Java," (2nd ed. 1997), which is entirely incorporated herein by reference.

In one embodiment the SClass standard methods include getSupportedClass( ) 164 and getInstance( ) 166. The getSupportedClass method 164 returns the name of a class a particular supporter claims to support. For example, a Supporter for TextField components would return "TextField" in response to the invocation of its getSupportedClass method. The getInstance class 166 returns a clone (i.e., instance) of its associated Supporter class. This method is invoked whenever a new Supporter instance is required. Each Supporter class 162-I (I=2 to N) extends the Supporter interface 162-1 by adding methods appropriate to its associated type. For example, in addition to the standard methods, a TextField supporter night provide include( ) and remove( ) methods for use on TextField components. Typically, the Supporter classes 162 are provided to developers who need to write code to support a new API or device by the creators of the API or device.

The SupporterAffinity class 170 embodies many of the teachings of the present invention. A key role of the SupporterAffinity class is to define methods that can be employed by Container objects 128 to locate and manage Supporters 130 for its Container objects 128. Another key role of the SupporterAffinity class 170 is to define data structures for organizing Supporters 130 associated with a particular Container object 128. In one embodiment the SupporterAffinity methods include addSupporter( ) 172 and getSupporter( ) 174. The SupporterAffinity data structures include a Library of Supporters 176 that holds Supporters registered to a particular SupporterAffinity object 132.

Figure 3:
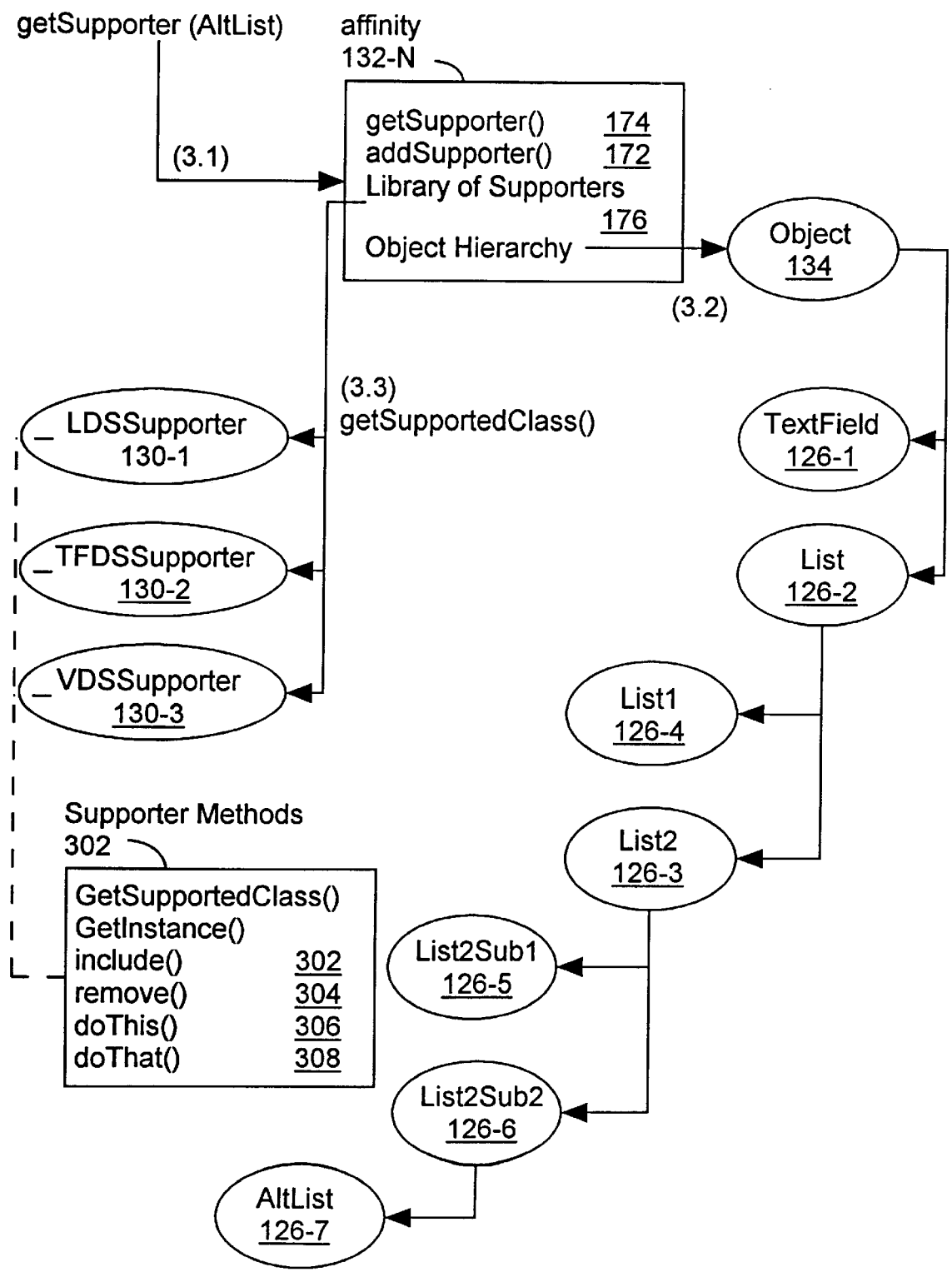
FIG. 3 is a flow diagram of operations performed by the GetSupporter method of a SupporterAffinity when asked by an instance of the Container class 156-N to return a supporter for a particular object AltList.
Figure 4:
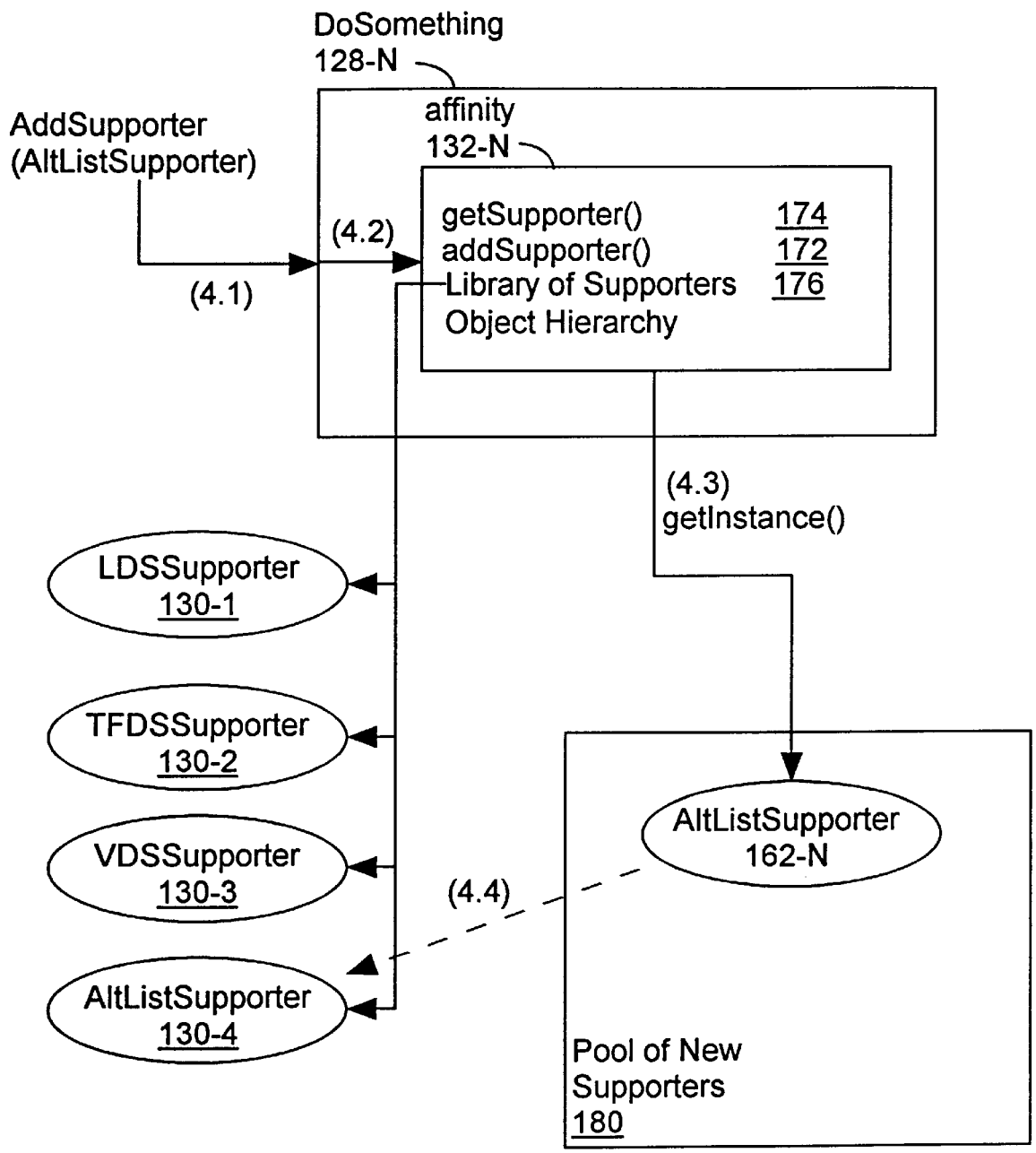
FIG. 4 is a flow diagram of operations performed by the AddSupporter method of a SupporterAffinity when asked by an instance of the Container class 156-N to add a supporter for an object AltList of unspecified type.
Figure 5:
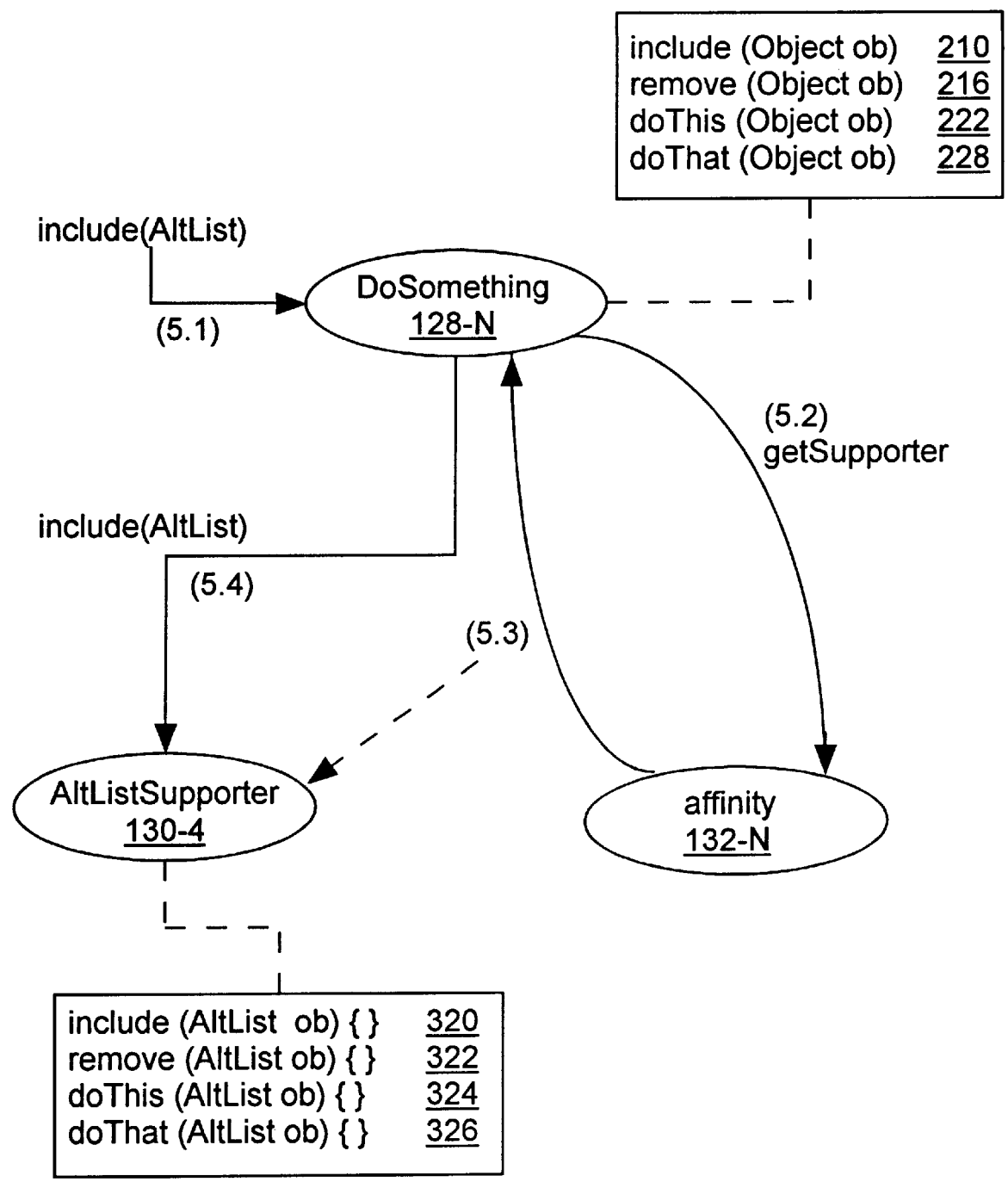
FIG. 5 is a flow diagram of operations performed by a Container class instance when one of its methods is invoked on an object AltList of unspecified type.

The operation of the addSupporter( ) and getSupporter( ) methods 172, 174 and the Supporters Library 176 are described in depth in reference to FIGS. 3, 4 and 5. However, briefly, each Container 128 (hereinafter, most objects are referred to without the "object" modifier) has a private SupporterAffinity 132 that manages Supporters 130 employed by the Container 128 to work with its Contained objects 126. Supporter objects 130 are added to the SupporterAffinity object 132 (i.e., to the SupporterAffinity Library 176) using the addSupporter( ) method 172. The SupporterAffinity 132 can only work with Supporters that have been registered to it. Assuming that a complete set of Supporters has been registered to a SupporterAffinity object 132, the getSupporter( ) method 174 is configured to return from the SupporterAffinity Library 176 whichever registered Supporter is best able to handle a Contained object passed to the getSupporter( ) method as an argument. For the purposes of the present invention, the "best support" for a particular Contained class is provided by the supporter that supports the same class as, or the most similar class to, the particular Contained class. A novel feature of the getSupporters( ) method 174 is that is does not need to be told the type of the object to be supported. Instead, the getSupporters( ) method 174 traverses an object hierarchy starting from an object passed to it and ending at the top level Object object 178. Then, for each object in the chain of objects, the getSupporters( ) method uses the getSupported Class( ) method 164 common to all Supporters 130 to ask each of the registered Supporters what class it claims to support. The getSupporters( ) method then returns the first Supporter it finds that is compatible with the class passed to it. This bottom-up strategy ensures that the returned Supporter is the best match to the object input to the getSupporters( ) method. An example is now described in reference to FIG. 2.

Referring to FIG. 2, there are shown block diagrams of:
a Container class ("DoSomething") 156-N;
a DoSomethingSupporter interface 162-N that extends the basic Supporter interface 161-1 to conform to the additional methods of the DoSomething class 156-N; and
a portion of a program 150-N that includes statements used to add new supporters to the SupporterAffinity object associated with the DoSomething class.

The first statement 202 of the DoSomething class 156-N creates a private instance ("affinity") of the SupporterAffinity class. This statement is executed every time a new instance of the DoSomething class is instantiated. The statement 204 declares an addSupporter method that simply invokes the addSupporter method of the private "affinity" object. This method is invoked with a statement of the form DoSomething.addSupporter (SupporterArg), where SupporterArg is an instance of a particular type of supporter. The statement 206 is the constructor method of the DoSomething class 156-N. Invoking this method returns an instance of the DoSomething class.

The statements 210, 216, 222, 228 are declarations of methods on objects Contained by the DoSomething class 156-N. For example, assuming the Contained objects are all GUI components, the "include" method 210 is invoked to include in a program 150 any one of the Contained GUI components. Each method 210, 216, 222, 228 is invoked with a statement of the form "DoSomething.cMethod (Object ob)", where cMethod is a method name and ob is the Contained object to which the method is to be applied. A unique aspect of the present invention is that these methods on the Container object do not include any code specific to a given Contained object, just the invocation to the getSupporter of the SupporterAffinity class, the invocation of the cMethod of the just returned Supporter and any code that applies to all the Contained objects, thus implemented in the cMethod of the container class. Another unique aspect of the present invention is that the class of the object ob passed to these methods is not specified; instead, the getSupporter method discovers the object's class.

For example, the statement 212 invokes the getSupporter method of the "affinity" object with the object ob. As described above, the getSupporter method searches its library of supporters and returns an instance s of the Supporter that best supports the object ob. The statement 214 then invokes the "include" method of the Supporter s on the object ob. In this way the correct "include" method is invoked without the programmer ever needing to indicate or test for the class of the object ob.

In one embodiment the cMethod is invoked on a Supporter s returned by the getSupporter method only after it is recast as an instance of the extended interface type specific to the Container class. For example, the statement 214 "((DoSomethingSupporter) (s)).include(ob))" recasts the Supporter s as a DoSomethingSupporter before invoking the include method. This is because the particular Contained methods cMethod are only defined by an extended interface 161-2 . . . 161-N, not the standard interface 161-1. For example, referring to FIG. 2, there is shown an example of the extended interface (DoSomethingSupporter 162-N) corresponding to the DoSomething Container class 156-N. The DoSomethingSupporter interface includes declarations 240, 242, 246, 248 of the four methods (include, remove, doThis, doThat) that the DoSomething class uses on Contained objects. The DoSomethingSupporter interface 162-N does not actually include code for the methods, which are contained in respective Supporters.

The program fragment 150-N shows statements 250, 252, 254 that are used to add Supporters to the DoSomething class's SupporterAffinity. Each of these statements invokes the addSupporter method 204 of the DoSomething class 156-N. For example, the statements 250 adds a TextFieldDoSomethingSupporter (TFDSSupporter) to the DoSomething class's SupporterAffinity. It can be assumed that the TextFieldDoSomethingSupporter (TFDSSupporter) provides include, remove, doThis and doThat methods on TextFields. The statements 252, 254 respectively add a ListDoSomethingSupporter (LDSSupporter) and a VectorDoSomethingSupporter (VDSSupporter), which provide similar methods for List and Vector components. Because, in this embodiment the supporters can only be used within the context of a SupporterAffinity, they must first be added to the appropriate class using statements as shown in the Program fragment 150-N.

Referring to FIG. 3, there is shown a flow chart illustrating the steps by which a SupporterAffinity 132-N executes a getSupporter operation. The order of the steps is indicated with reference numbers enclosed by parentheses; e.g., "(3.1)". For the purposes of the this discussion it is a given that the affinity 132-N is associated with the DoSomething class 156-N, which initially invokes (3.1) the getSupporter method with an argument, AltList, that is an object instance of an AltList class 126-7. As already described, the affinity 132-N includes getSupporter and addSupporter methods 174, 172, a library of supporters 176 and a pointer to the Object object 134, which is the root of the hierarchy of program objects 126.

For this example:
(1) the top level objects just under the Object object 134, include the TextField and List objects 126-1, 126-2,
(2) the List objects are further subdivided into List1 and List2 objects 126-4, 126-3,
(3) the List2 objects are further subdivided into ListSub1 and List2Sub2 objects 126-5, 126-6; and
(4) the ListSub2 objects are further subdivided into AltList objects 126-7.

In this example the Supporters registered to the affinity 132 include:

| | |
|---|---|
| LDSSupporter 130-1 | the ListDoSomethingSupporter; |
| TFDSSupporter 130-2 | the TextFieldDoSomethingSupporter; and |
| VDSSupporter 130-3 | the VectorDoSomethingSupporter. |

Each of these Supporters 130 includes the required getSupportedClass and getInstance methods 164, 166 and methods for supporting a corresponding Contained class 152. For example, the Supporters 130-1, 130-2, 130-3 provide include, remove, doThis and doThat methods 302, 304, 306, 308.

Given this infrastructure, when it receives the getSupporter(AltList) message (3.1) the affinity 132-N first locates the argument object (AltList 126-7) in the object hierarchy (3.2). The affinity 132-N then asks each of its Supporters 130 (using the GetSupportedClass method 164) which object class it claims to support. If one of the Supporters 130 supports the exact class (i.e., the AltList class), the affinity 132-N, returns that class. In this example, because, none of the Supporters 130 supports the AltList class, the affinity 132-N attempts to find the Supporter 130 that best supports the AltList class. The affinity 132-N does this by determining whether each of the classes supports the next closest class in the object hierarchy to the AltList class 126-7. The affinity 132-N repeats this process until it runs out of objects or finds a Supporter that supports s()me object in the same line of objects as the passed in object. For example, in this situation, because the LDSSupporter 130-1 supports the List class and the AltList object 126-7 is a child of the List objects 126-2, the affinity 132-N returns the LDSSupporter 130-1. This procedure ensures that the Supporter returned by the affinity 132-N is the best match to the passed-in object.

Referring to FIG. 4, there is shown an example of how an AltList Supporter 130-N is added to the affinity 132-N of FIG. 3. The first step (4.1) involves a programmer invoking in a program 150 the addSupporter( ) method of a DoSomething object 128-N with an argument (i.e., AltListSupporter) naming the Supporter to be added. The DoSomething object 128-N in turn invokes the affinity's addSupporter( ) method 172 (4.2) with the same argument (i.e., AltListSupporter). The addSupporter( ) method 172 locates the named Supporter class 162-N in pool 180 of new (i.e, unregistered) Supporters and invokes the named Supporter's getInstance method 166 (4.3). The getInstance method 166 returns an instance of the named Supporter, which the affinity 132-N adds to its library of supporters 176 (4.4). Thus, in the example of FIG. 4, following the last step (4.4) the AltListSupporter 130-N has been added to the Library of Supporters 176. Referring again to FIG. 3, if the AltListSupporter 130-N were available, the affinity object 132-N would have returned that Supporter instead of the less satisfactory LDSSupporter 130-1.

After an appropriate Supporter instance has been returned by the SupporterAffinity (e.g., by the affinity 132-N) as described in reference to FIG. 3, the Container class is able to invoke a method of the returned Supporter on the object that was passed to the Container class without any identification of its type. An illustration of such an operation is now described in reference to FIG. 5.

Referring to FIG. 5, there is shown a flow diagram of some of the steps that occur when the include method 210 of the DoSomething object 128-N is invoked on an AltList object (5.1). As the first step the include method 210 calls the getSupporter method of its private SupporterAffinity 132-N (5.2), which returns an instance 130-N of the AltListSupporter (5.3) according the method described in reference to FIG. 3. The DoSomethingSupporter 156-N then invokes the include method 320 of the AltListSupporter on the AltList object (5.4). The AltListSupporter also includes remove, doThis, doThat methods 322, 324, 326 and, possibly, other methods on AltList objects that can be invoked by the DoSomething class or other classes.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, the present invention can be used in any context where there it is desirable to manage Contained objects. The present invention can be implemented in any object-oriented language.

What is claimed is:

1. A system for adding support for contained classes to a container class, comprising:
   a first set of supporters, each of which provides first supporter methods for a first contained class;
   a second set of supporters that is a subset of the first set, each of the second set providing second supporter methods for a second contained class; and
   an affinity object associated with a container class instance that:
      manages the second set of supporters and
      enables the container class instance to interact with instances of the second contained class using the second supporter methods;
   the affinity object providing a first affinity method configured to add a new supporter for a particular contained class from the first set to the second set when the first affinity method is invoked on an instance of the particular contained class whose supporter is in the first set and not the second set.

2. The system of claim 1, wherein the new supporter is the supporter from the first set that best supports the particular contained class.

3. The system of claim 2, wherein the supporter from the first set that best supports the particular contained class is a supporter that exactly supports the particular contained class.

4. The system of claim 2, wherein:
   when the first set does not include the supporter that exactly supports the particular contained class, the supporter from the first set that best supports the particular contained class is a supporter that exactly supports a contained class that is a nearest ancestor of the particular contained class in an object hierarchy.

5. The system of claim 2, wherein:
   when the first set does not include the supporter that exactly supports the particular contained class, the supporter from the first set that best supports the particular contained class is a supporter that exactly supports a contained class that shares methods and characteristics with the particular contained class.

6. The system of claim 1, wherein:
   each of the supporter classes includes a first supporter method that returns a class_supported name that identifies the contained class that that supporter claims to support;
   the affinity object being configured to:
      traverse an object hierarchy in reverse, starting at the particular contained class and ending at a top level object,
      for each traversed class in the object hierarchy, query each of the first set of supporters with the first supporter method, and
      return a new instance of a matching supporter when, in response to the first supporter method query, the matching supporter returns a class_supported name that matches the particular contained class.

7. The system of claim 1, wherein the contained class does not need to be recoded when the new supporter is added to the contained class.

8. The system of claim 1, wherein:
   the container class comprises at least one contained method for manipulating the instances of the contained classes, each of the contained methods being invocable with an object ob and needing no more than two statements,
   a first of the two statements invoking the first affinity object method on an object ob that attempts to obtain from the affinity object a supporter s associated with the class of the object ob; and
   a second of the two statements, when the first affinity object method is successful, invoking a method of the supporter s on the object ob.

9. The system of claim 8, wherein the container class further comprises:

an affinity object initialization statement that, when invoked, returns an instance of the affinity object that is private to the container class.

10. The system of claim 9, wherein the affinity object initialization statement is invoked whenever a new instance of the container class is constructed.

11. The system of claim 1, wherein the first set of supporters is packaged as a library that can be shipped with at least one of:
programming environments
updated APIs; and
device drivers.

12. A method for adding support for contained classes to a container class, comprising:
an instance of the container class requesting support for an instance of a particular contained class;
determining whether a respective supporter compatible with the particular contained class is in a pool of supporters managed by an affinity object through which the container class instance gains access to the supporters;
when the respective supporter is in the pool of supporters, the affinity object returning a new instance of the respective supporter to the container class, the container class subsequently invoking methods of the new instance to interact with the instance of the particular contained class.

13. The method of claim 12, further comprising:
when the respective supporter is not in the pool of supporters, adding the respective supporter to the pool of supporters from a library of supporters and returning the new instance of the respective supporter to the container class.

14. The method of claim 13, wherein the adding and returning step comprises:
the affinity object:
traversing an object hierarchy in reverse, starting at the particular contained class and ending at a top level object;
for each traversed class in the object hierarchy, querying each of the library with a first supporter method that returns a class_supported name identifying the contained class that that supporter claims to support; and
returning the new instance of a matching supporter when, in response to the first supporter method query, the matching supporter returns a class_supported name that matches the particular contained class.

15. The method of claim 12, wherein:
the new instance is the supporter from the pool of supporters that best supports the particular contained class.

16. The method of claim 15, wherein:
the supporter from the pool of supporters that best supports the particular contained class is a supporter that exactly supports the particular contained class.

17. The method of claim 15, wherein:
when the pool of supporters does not include a supporter that exactly supports the particular contained class, the supporter from the pool of supporters that best supports the particular contained class is a supporter that exactly supports a contained class that is nearest ancestor of the particular contained class in an object hierarchy.

18. The method of claim 15, wherein:
when the first set does not include a supporter that exactly supports the particular contained class, the supporter from the first set that best supports the particular contained class is a supporter that exactly supports a contained class that shares methods and characteristics with the particular contained class.

19. The method of claim 12, wherein:
the container class comprises at least one contained method for manipulating the instances of the contained classes, each of the contained methods being invocable with an object ob and needing no more than two statements,
a first of the two statements invoking the first affinity object method on an object ob that attempts to obtain from the affinity object a supporter s associated with the class of the object ob; and
a second of the two statements, when the first affinity object method is successful, invoking a method of the supporter s on the object ob.

20. The method of claim 19, wherein the container class further comprises:
an affinity object initialization statement that, when invoked, returns an instance of the affinity object that is private to the container class.

21. The method of claim 20, further comprising: invoking the affinity object initialization statement whenever a new instance of the container class is constructed.

22. A computer program product for adding support for contained classes to a container class, the computer program product including a computer readable medium and a computer mechanism stored thereon, the computer mechanism comprising:
a first set of supporter classes, each of which provides first supporter methods for a first contained class;
a second set of supporter classes, each of the second set providing second supporter methods for a second contained class; and
an affinity class that configures a computer in whose memory a container class instance is allocated to:
allocate in the memory an instance of the affinity class that manages instances of the second set of supporters for use by the container class instance to interact with instances of the second contained class using the second supporter methods; and
add a new supporter instance for a particular contained class from the first set to the instances of the second set when a first method of the affinity class instance is invoked on an instance of the particular contained class whose supporter is in the first set and not the second set.

23. The computer program product of claim 22, wherein the new supporter is the supporter from the first set that best supports the particular contained class.

24. The computer program product of claim 23, wherein the supporter from the first set that best supports the particular contained class is a supporter that exactly supports the particular contained class.

25. The computer program product of claim 23, wherein:
when the first set does not include the supporter that exactly supports the particular contained class, the supporter from the first set that best supports the particular contained class is a supporter that exactly supports a contained class that is nearest ancestor of the particular contained class in an object hierarchy.

26. The computer program product of claim 23, wherein:
when the first set does not include the supporter that exactly supports the particular contained class, the supporter from the first set that best supports the particular contained class is a supporter that exactly supports a contained class that shares methods and characteristics with the particular contained class.

27. The computer program product of claim 22, wherein:
each of the supporter classes includes a first supporter method that returns a class_supported name that identifies the contained class that that supporter claims to support;
the affinity object being configured to:
traverse an object hierarchy in reverse, starting at the particular contained class and ending at a top level object,
for each traversed class in the object hierarchy, query each of the first set of supporters with the first supporter method, and
return a new instance of a matching supporter when, in response to the first supporter method query, the matching supporter returns a class_supported name that matches the particular contained class.

28. The computer program product of claim 22, wherein the contained class does not need to be recoded when the new supporter is added to the contained class.

29. The computer program product of claim 22, wherein:
the container class comprises at least one contained method for manipulating the instances of the contained classes, each of the contained methods being invocable with an object ob and needing no more than two statements,
a first of the two statements invoking the first affinity object method on an object ob that attempts to obtain from the affinity object a supporter s associated with the class of the object ob; and
a second of the two statements, when the first affinity object method is successful, invoking a method of the supporter s on the object ob.

30. The computer program product of claim 29, wherein the container class further comprises:
an affinity object initialization statement that, when invoked, returns an instance of the affinity object that is private to the container class.

31. The computer program product of claim 30, wherein the affinity object initialization statement is invoked whenever a new instance of the container class is constructed.

32. The computer program product of claim 22, wherein the first set of supporters is packaged as a library that can be shipped with at least one of:

programming environments updated APIs; and device drivers.

\* \* \* \* \*